United States Patent
Hwang et al.

(10) Patent No.: US 10,196,516 B2
(45) Date of Patent: Feb. 5, 2019

(54) COPOLYCARBONATE RESIN COMPOSITION AND ARTICLE INCLUDING THE SAME

(71) Applicant: LG CHEM, LTD., Seoul (KR)

(72) Inventors: Young Young Hwang, Daejeon (KR); Hyong Min Bahn, Daejeon (KR); Jung Jun Park, Daejeon (KR); Moo Ho Hong, Daejeon (KR); Byoung Kyu Chun, Daejeon (KR); Un Ko, Daejeon (KR); Ki Jae Lee, Daejeon (KR); Young Wook Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/500,242

(22) PCT Filed: Dec. 3, 2015

(86) PCT No.: PCT/KR2015/013157
§ 371 (c)(1),
(2) Date: Jan. 30, 2017

(87) PCT Pub. No.: WO2016/089135
PCT Pub. Date: Jun. 9, 2016

(65) Prior Publication Data
US 2017/0275456 A1    Sep. 28, 2017

(30) Foreign Application Priority Data

Dec. 4, 2014 (KR) .................. 10-2014-0173005
Dec. 2, 2015 (KR) .................. 10-2015-0170782

(51) Int. Cl.
| | | |
|---|---|---|
| C08L 69/00 | (2006.01) | |
| C08L 83/04 | (2006.01) | |
| C08G 64/18 | (2006.01) | |
| C08G 64/38 | (2006.01) | |
| C08G 77/448 | (2006.01) | |
| C08J 5/00 | (2006.01) | |
| C08G 64/16 | (2006.01) | |
| C08G 64/06 | (2006.01) | |
| C08G 64/30 | (2006.01) | |
| C08G 64/08 | (2006.01) | |
| C08K 5/3475 | (2006.01) | |
| C08G 64/24 | (2006.01) | |
| C08L 83/10 | (2006.01) | |
| C08K 5/00 | (2006.01) | |
| C08G 64/22 | (2006.01) | |
| C08G 77/14 | (2006.01) | |
| C08L 83/06 | (2006.01) | |
| C08J 5/08 | (2006.01) | |
| C08K 5/521 | (2006.01) | |
| C08L 51/04 | (2006.01) | |
| C08K 5/42 | (2006.01) | |
| C09K 21/14 | (2006.01) | |
| C08G 77/20 | (2006.01) | |

(52) U.S. Cl.
CPC .............. *C08L 69/00* (2013.01); *C08G 64/06* (2013.01); *C08G 64/085* (2013.01); *C08G 64/1666* (2013.01); *C08G 64/1691* (2013.01); *C08G 64/18* (2013.01); *C08G 64/186* (2013.01); *C08G 64/22* (2013.01); *C08G 64/24* (2013.01); *C08G 64/307* (2013.01); *C08G 64/38* (2013.01); *C08G 77/14* (2013.01); *C08G 77/20* (2013.01); *C08G 77/448* (2013.01); *C08J 5/00* (2013.01); *C08J 5/08* (2013.01); *C08K 5/005* (2013.01); *C08K 5/3475* (2013.01); *C08K 5/42* (2013.01); *C08K 5/521* (2013.01); *C08L 51/04* (2013.01); *C08L 69/005* (2013.01); *C08L 83/04* (2013.01); *C08L 83/06* (2013.01); *C08L 83/10* (2013.01); *C09K 21/14* (2013.01); *C08L 2201/08* (2013.01); *C08L 2201/10* (2013.01); *C08L 2205/02* (2013.01); *C08L 2205/025* (2013.01); *C08L 2205/03* (2013.01); *C08L 2205/035* (2013.01); *C08L 2205/05* (2013.01); *C08L 2205/06* (2013.01); *C08L 2207/53* (2013.01)

(58) Field of Classification Search
None
See application file for complete search history.

(56) References Cited

U.S. PATENT DOCUMENTS

| 3,819,744 A | 6/1974 | Buechner et al. |
| 5,137,949 A | 8/1992 | Paul et al. |

(Continued)

FOREIGN PATENT DOCUMENTS

| CN | 101124282 A | 2/2008 |
| CN | 101585961 A | 11/2009 |

(Continued)

OTHER PUBLICATIONS

Hwang, et al.: "Production of impact strength and fluidity-improved polycarbonate and composition comprising same", Chemical Abstract for US2016/0251481A1, Mar. 24, 2016.

(Continued)

*Primary Examiner* — David J Buttner
(74) *Attorney, Agent, or Firm* — Dentons US LLP

(57) ABSTRACT

Disclosed are a copolycarbonate resin composition having improved mechanical properties such as impact resistance and chemical resistance while maintaining resin flowability, and an article including the same, where the copolycarbonate resin composition comprises a copolycarbonate resin including an aromatic polycarbonate-based first repeating unit and one or more aromatic polycarbonate-based second repeating unit having at least one siloxane bond; and a polysiloxane polymer containing a hydrocarbon-based functional group having 2 or more carbon atoms.

17 Claims, No Drawings

(56) References Cited

U.S. PATENT DOCUMENTS

| | | | |
|---|---|---|---|
| 5,324,454 A | 6/1994 | Takata et al. | |
| 5,380,795 A | 1/1995 | Gosens et al. | |
| 5,455,310 A | 10/1995 | Hoover et al. | |
| 5,502,134 A | 3/1996 | Okamoto et al. | |
| 5,608,026 A | 3/1997 | Hoover et al. | |
| 5,783,651 A | 7/1998 | König et al. | |
| 5,932,677 A | 8/1999 | Hoover et al. | |
| 6,001,929 A | 12/1999 | Nodera et al. | |
| 6,252,013 B1 | 6/2001 | Banach et al. | |
| 6,281,286 B1 | 8/2001 | Chorvath et al. | |
| 6,780,956 B2 | 8/2004 | Davis | |
| 7,135,538 B2 | 11/2006 | Glasgow et al. | |
| 7,332,559 B2 | 2/2008 | Hong et al. | |
| 7,432,327 B2 | 10/2008 | Glasgow | |
| 7,498,401 B2 | 3/2009 | Agarwal | |
| 7,524,919 B2 | 4/2009 | Hoover et al. | |
| 7,691,304 B2 | 4/2010 | Agarwal et al. | |
| 7,709,581 B2 | 5/2010 | Glasgow et al. | |
| 7,718,733 B2 | 5/2010 | Juikar et al. | |
| 8,030,379 B2 | 10/2011 | Nodera et al. | |
| 8,084,134 B2 | 12/2011 | Malinoski et al. | |
| 8,124,683 B2 | 2/2012 | Jung et al. | |
| 8,389,648 B2 | 3/2013 | Adoni et al. | |
| 8,466,249 B2 | 6/2013 | Gallucci et al. | |
| 8,552,096 B2 | 10/2013 | Li et al. | |
| 8,912,290 B2 | 12/2014 | Huggins et al. | |
| 8,933,186 B2 | 1/2015 | Bahn et al. | |
| 8,962,780 B2 | 2/2015 | Higaki et al. | |
| 8,981,017 B2 | 3/2015 | Ishikawa | |
| 9,062,164 B2 | 6/2015 | Kim et al. | |
| 9,080,021 B2 | 7/2015 | Ishikawa et al. | |
| 9,102,832 B2 | 8/2015 | Sybert et al. | |
| 9,255,179 B2 | 2/2016 | Park et al. | |
| 9,505,929 B2 | 11/2016 | Natarajan et al. | |
| 2003/0027905 A1 | 2/2003 | Mahood et al. | |
| 2003/0065122 A1 | 4/2003 | Davis | |
| 2004/0200303 A1 | 10/2004 | Inoue et al. | |
| 2006/0148986 A1 | 7/2006 | Glasgow et al. | |
| 2007/0093629 A1 | 4/2007 | Silva et al. | |
| 2007/0135569 A1 | 6/2007 | Derudder | |
| 2007/0241312 A1 | 10/2007 | Hikosaka | |
| 2007/0258412 A1 | 11/2007 | Schilling et al. | |
| 2008/0015289 A1 | 1/2008 | Siripurapu | |
| 2008/0081895 A1 | 4/2008 | Lens et al. | |
| 2008/0230751 A1 | 9/2008 | Li et al. | |
| 2009/0087761 A1 | 4/2009 | Fukushima et al. | |
| 2009/0326183 A1 | 12/2009 | Schultz et al. | |
| 2010/0233603 A1 | 9/2010 | Hikosaka | |
| 2011/0003128 A1* | 1/2011 | Isozaki | C08L 69/00 428/220 |
| 2012/0123034 A1 | 5/2012 | Morizur et al. | |
| 2012/0251750 A1 | 10/2012 | Sybert et al. | |
| 2012/0252985 A1 | 10/2012 | Rosenquist et al. | |
| 2012/0271009 A1 | 10/2012 | Higaki et al. | |
| 2012/0283393 A1 | 11/2012 | Ishikawa | |
| 2013/0003544 A1 | 1/2013 | Wermuth et al. | |
| 2013/0082222 A1 | 4/2013 | Aoki | |
| 2013/0186799 A1 | 7/2013 | Stam et al. | |
| 2013/0190425 A1 | 7/2013 | Zhu et al. | |
| 2013/0267665 A1 | 10/2013 | Huggins et al. | |
| 2013/0274392 A1 | 10/2013 | Morizur et al. | |
| 2013/0289224 A1 | 10/2013 | Bae et al. | |
| 2013/0309474 A1 | 11/2013 | Peek et al. | |
| 2013/0313493 A1 | 11/2013 | Wen et al. | |
| 2013/0317142 A1 | 11/2013 | Chen et al. | |
| 2013/0317146 A1 | 11/2013 | Li et al. | |
| 2013/0317150 A1 | 11/2013 | Wan et al. | |
| 2013/0331492 A1 | 12/2013 | Sharma | |
| 2014/0058024 A1 | 2/2014 | Son et al. | |
| 2014/0106208 A1 | 4/2014 | Ishikawa et al. | |
| 2014/0148559 A1 | 5/2014 | Kim et al. | |
| 2014/0179843 A1 | 6/2014 | Van Der Mee et al. | |
| 2014/0194561 A1* | 7/2014 | Ganguly | C08L 83/10 524/262 |
| 2014/0206802 A1 | 7/2014 | Bahn et al. | |
| 2014/0323623 A1 | 10/2014 | Miyake et al. | |
| 2015/0057423 A1 | 2/2015 | Kim et al. | |
| 2015/0175802 A1 | 6/2015 | Sybert et al. | |
| 2015/0197633 A1 | 7/2015 | Van Der Mee et al. | |
| 2015/0210854 A1 | 7/2015 | Aoki | |
| 2015/0218371 A1 | 8/2015 | Lee et al. | |
| 2015/0307706 A1 | 10/2015 | Rosenquist et al. | |
| 2015/0315380 A1 | 11/2015 | Bahn et al. | |
| 2015/0344623 A1 | 12/2015 | Park et al. | |
| 2015/0368484 A1 | 12/2015 | Shishaku et al. | |
| 2016/0002410 A1 | 1/2016 | Iyer et al. | |
| 2016/0017102 A1 | 1/2016 | Yamada | |
| 2016/0122477 A1 | 5/2016 | Rhee et al. | |
| 2016/0122534 A1* | 5/2016 | Zhou | C08L 83/04 524/151 |
| 2016/0251481 A1 | 9/2016 | Hwang et al. | |
| 2016/0297926 A1 | 10/2016 | Hwang et al. | |
| 2016/0326312 A1 | 11/2016 | Park et al. | |
| 2016/0326313 A1 | 11/2016 | Son et al. | |
| 2016/0326314 A1 | 11/2016 | Son et al. | |
| 2016/0326321 A1 | 11/2016 | Park et al. | |
| 2016/0369047 A1 | 12/2016 | Hwang et al. | |
| 2016/0369048 A1 | 12/2016 | Park et al. | |
| 2017/0306146 A1 | 10/2017 | Lee et al. | |
| 2017/0321014 A1 | 11/2017 | Lee et al. | |

FOREIGN PATENT DOCUMENTS

| | | |
|---|---|---|
| CN | 102015894 A | 4/2011 |
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 104837895 A | 8/2015 |
| CN | 105899576 A | 8/2016 |
| EP | 0284865 A2 | 3/1988 |
| EP | 0685507 B1 | 10/1998 |
| EP | 1167449 A1 | 1/2002 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08081620 * | 2/1996 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002012755 A | 1/2002 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 2015-163722 A | 9/2015 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |

| | | | |
|---|---|---|---|
| KR | 10-2008-0083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 101563269 B1 | 10/2015 |
| KR | 1020150119823 A | 10/2015 |
| KR | 2015-0134457 A | 12/2015 |
| KR | 10-1664844 B1 | 10/2016 |
| TW | 201241043 A | 10/2012 |
| WO | 2012/060516 A1 | 5/2012 |
| WO | 2013/051557 A1 | 4/2013 |
| WO | 2013-058214 A1 | 4/2013 |
| WO | 2013-066000 A1 | 5/2013 |
| WO | 2013/073709 A1 | 5/2013 |
| WO | 2013/100606 A1 | 7/2013 |
| WO | 2013-115538 A1 | 8/2013 |
| WO | 2013/115604 A1 | 8/2013 |
| WO | 2013/175445 A2 | 11/2013 |
| WO | 2013175455 A1 | 11/2013 |
| WO | 2014/042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014/144673 A1 | 9/2014 |
| WO | 2014/179206 A2 | 11/2014 |
| WO | 2015/011669 A2 | 1/2015 |
| WO | 2015/015445 A2 | 2/2015 |
| WO | 2015/041441 A1 | 3/2015 |
| WO | 2015/087595 A1 | 6/2015 |

OTHER PUBLICATIONS

Chemical Abstract registry No. 163617-00-3, Jun. 8, 1995.

* cited by examiner

COPOLYCARBONATE RESIN COMPOSITION AND ARTICLE INCLUDING THE SAME

CROSS-REFERENCE TO RELATED APPLICATION

This application is a National Stage Application of International Application No. PCT/KR2015/013157 filed on Dec. 3, 2015, which claims priority to and the benefit of priority of Korean Patent Application No. 10-2014-0173005 filed on Dec. 4, 2014, and Korean Patent Application No. 10-2015-0170782 filed on Dec. 2, 2015, all of which are hereby incorporated by reference in their entirety for all purposes as if fully set forth herein.

BACKGROUND OF THE INVENTION

(a) Field of the Invention

The present invention relates to a copolycarbonate resin composition and an article including the same. More particularly, the present invention relates to a copolycarbonate resin composition having improved mechanical properties such as impact resistance and chemical resistance, while maintaining resin flowability, and an article including the same.

(b) Description of the Related Art

A polycarbonate resin which is prepared by condensation polymerization of an aromatic diol such as bisphenol A and a carbonate precursor such as phosgene has excellent impact strength, dimensional stability, thermal resistance, transparency, and the like, and is applied to wide range of fields such as exterior materials of electrical and electronic products, automotive components, building materials, and optical components.

In recent years, in order to apply this polycarbonate resin to more various fields, a lot of studies have been made for obtaining desired physical properties, by copolymerizing aromatic diol compounds having different structures from each other to introduce a monomer having a different structure to the main chain of the polycarbonate, thereby preparing copolycarbonate.

Particularly, a study of introducing a polysiloxane structure to the main chain of the polycarbonate is being conducted, however, there was a limitation that due to the high production cost of most of the techniques, economic efficiency is lowered, and chemical resistance or impact strength of the polycarbonate resin is deteriorated.

Thus, the development of a copolycarbonate resin composition which may sufficiently secure mechanical properties such as impact resistance and chemical resistance has been required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a copolycarbonate resin composition having improved mechanical properties such as impact resistance and chemical resistance, while maintaining resin flowability.

Further, the present invention has been made in an effort to provide an article including the copolycarbonate resin composition.

An exemplary embodiment of the present invention provides a copolycarbonate resin composition including: a copolycarbonate resin including an aromatic polycarbonate-based first repeating unit and one or more aromatic polycarbonate-based second repeating unit having at least one siloxane bond; and a polysiloxane polymer containing a hydrocarbon-based functional group having 2 or more carbon atoms.

Another embodiment of the present invention provides an article including the copolycarbonate resin composition.

Hereinafter, the copolycarbonate resin composition and the article including the same according to a specific embodiment of the present invention will be described in more detail.

According to an embodiment of the present invention, a copolycarbonate resin composition including: a copolycarbonate resin including an aromatic polycarbonate-based first repeating unit and one or more aromatic polycarbonate-based second repeating unit having at least one siloxane bond; and a polysiloxane polymer containing a hydrocarbon-based functional group having 2 or more carbon atoms may be provided.

The present inventors found out from experiments that with the use of the above described copolycarbonate resin composition, impact strength, particularly impact strength at low temperature together with flowability may be improved by the copolycarbonate resin including certain repeating units, and chemical stability may be improved by a polysiloxane copolymer containing a hydrocarbon-based functional group having 2 or more carbon atoms, thereby securing chemical resistance, and also impact resistance may be improved by a small amount of a hydrocarbon-based functional group having 2 or more carbon atoms, and has completed the present invention.

The copolycarbonate resin composition may improve mechanical properties, while maintaining flowability intrinsic to the copolycarbonate resin as it is, by mixing the above-described polysiloxane polymer containing the hydrocarbon-based functional group having 2 or more carbon atoms, with a general copolycarbonate resin in which an aromatic diol such as bisphenol A and a carbonate precursor such as phosgene are condensation-polymerized, or a copolycarbonate resin in which aromatic diol compounds having different structures from each other are copolymerized, in a manner of a master batch.

Particularly, it was confirmed that in the case of using a copolycarbonate resin in which a polysiloxane structure is introduced to the main chain of a copolycarbonate by copolymerizing aromatic diol compounds having different structures from each other, in addition to bisphenol A, there is little difference between impact strength at room temperature and impact strength at low temperature, thereby greatly improving impact resistance, and also securing flowability at a high level.

Hereinafter, the copolycarbonate resin composition will be described in detail.

Aromatic Polycarbonate-Based First Repeating Unit

The aromatic polycarbonate-based first repeating unit is formed by reacting an aromatic diol compound and a carbonate precursor, and may be represented by the following Chemical Formula 1:

[Chemical Formula 1]

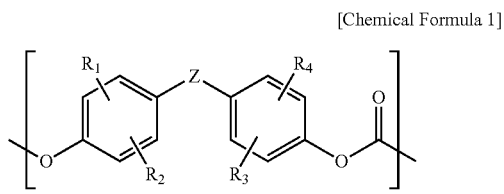

wherein $R_1$ to $R_4$ are independently of one another hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO. Preferably, $R_1$ to $R_4$ are independently of one another hydrogen, methyl, chloro, or bromo. Also preferably, Z is straight chain or branched chain $C_{1-10}$ alkylene unsubstituted or substituted with phenyl, more preferably methylene, ethane-1,1-diyl, propane-2,2-diyl, butane-2,2-diyl, 1-phenylethane-1,1-diyl, or diphenylmethylene. Also preferably, Z is cyclohexane-1,1-diyl, O, S, SO, $SO_2$, or CO. Preferably, the repeating unit represented by Chemical Formula 1 may be derived from any one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenyl methane and α,ω-bis[3-(o-hydroxyphenyl)propyl]polydimethylsiloxane. The phrase 'derived from aromatic diol compounds' refers to forming the repeating unit represented by Chemical Formula 1 by reacting a hydroxy group of the aromatic diol compound and the carbonate precursor. For example, when bisphenol A which is the aromatic diol compound and triphosgene which is the carbonate precursor are polymerized, the repeating unit represented by Chemical Formula 1 is represented by the following Chemical Formula 1-1:

[Chemical Formula 1-1]

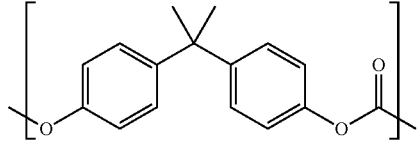

As the carbonate precursor, one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromophosgene and bishaloformate may be used, and preferably, triphosgene or phosgene may be used.

Aromatic Polycarbonate-Based Second Repeating Unit

1) The copolycarbonate resin including the aromatic polycarbonate-based first repeating unit is distinguished from 2) the copolycarbonate resin including the aromatic polycarbonate-based first repeating unit and the aromatic polycarbonate-based second repeating unit having at least one siloxane bond, in that a polysiloxane structure is not introduced to the main chain of copolycarbonate in 1).

The aromatic polycarbonate-based second repeating unit having at least one siloxane bond may include one or more, or two or more repeating units selected from the group consisting of the repeating units represented by the following Chemical Formula 2 to 4:

[Chemical Formula 2]

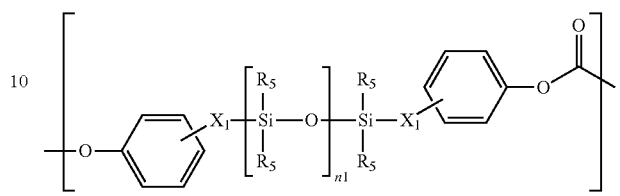

wherein $X_1$ is independently of each other $C_{1-10}$ alkylene, $R_5$ is independently of each other hydrogen; $C_{1-15}$ alkyl unsubstituted or substituted with oxiranyl, oxiranyl-substituted $C_{1-10}$ alkoxy or $C_{6-20}$ aryl; halogen; $C_{1-10}$ alkoxy; allyl; $C_{1-10}$ haloalkyl; or $C_{6-20}$ aryl, and n1 is an integer of 10 to 200,

[Chemical Formula 3]

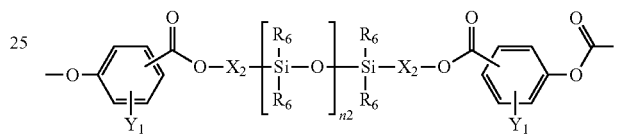

wherein $X_2$ is independently of each other $C_{1-10}$ alkylene, $Y_1$ is independently of each other hydrogen, $C_{1-6}$ alkyl, halogen, hydroxy, $C_{1-6}$ alkoxy or $C_{6-20}$ aryl, and $R_6$ is independently of each other hydrogen; $C_{1-15}$ alkyl unsubstituted or substituted with oxiranyl, oxiranyl-substituted $C_{1-10}$ alkoxy or $C_{6-20}$ aryl; halogen; $C_{1-10}$ alkoxy; allyl; $C_{1-10}$ haloalkyl; or $C_{6-20}$ aryl, n2 is an integer of 10 to 200,

[Chemical Formula 4]

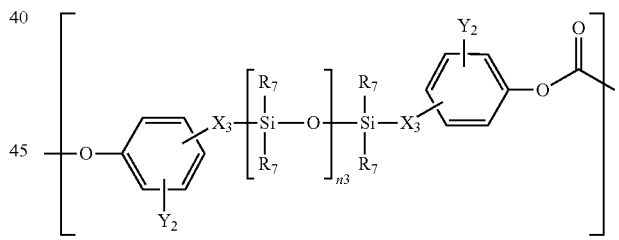

wherein $X_3$ is independently of each other $C_{1-10}$ alkylene, $Y_2$ is independently of each other $C_{1-10}$ alkoxy, $R_7$ is independently of each other hydrogen; $C_{1-15}$ alkyl unsubstituted or substituted with oxiranyl, oxiranyl-substituted $C_{1-10}$ alkoxy or $C_{6-20}$ aryl; halogen; $C_{1-10}$ alkoxy; allyl; $C_{1-10}$ haloalkyl; or $C_{6-20}$ aryl, and n3 is an integer of 10 to 200.

In Chemical Formula 2, preferably, $X_1$ is independently of each other $C_{2-10}$ alkylene, more preferably $C_{2-4}$ alkylene, most preferably propane-1,3-diyl. Also preferably, $R_5$ is independently of each other hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl.

Also preferably, $R_5$ is independently of each other $C_{1-10}$ alkyl, more preferably $C_{1-6}$ alkyl, still more preferably $C_{1-3}$ alkyl, and most preferably methyl.

Also preferably, n1 is i) an integer of 30 to 60, ii) an integer of 20 or more, 25 or more, or 30 or more, 40 or less, or 35 or less, or iii) an integer of 50 or more, or 55 or more, 70 or less, 65 or less, or 60 or less.

Also preferably, Chemical Formula 2 is represented by the following Chemical Formula 2-1:

[Chemical Formula 2-1]

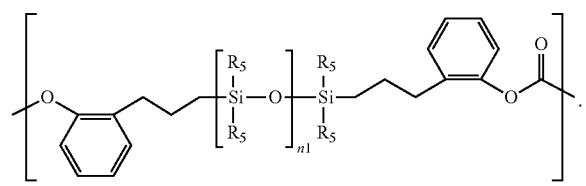

In Chemical Formula 3, preferably, $X_2$ is independently of each other $C_{2-10}$ alkylene, more preferably $C_{2-6}$ alkylene, most preferably isobutylene. Also preferably, $Y_1$ is hydrogen.

Also preferably, $R_6$ is independently of each other hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl.

Also preferably, $R_6$ is independently of each other $C_{1-10}$ alkyl, more preferably $C_{1-6}$ alkyl, still more preferably $C_{1-3}$ alkyl, and most preferably methyl.

Also preferably, n2 is i) an integer of 30 to 60, ii) an integer of 20 or more, 25 or more, or 30 or more, 40 or less, or 35 or less, or iii) an integer of 50 or more, or 55 or more, 70 or less, 65 or less, or 60 or less.

Also preferably, Chemical Formula 3 is represented by the following Chemical Formula 3-1:

[Chemical Formula 3-1]

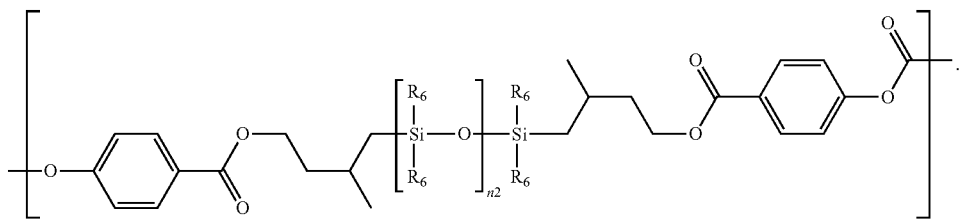

In Chemical Formula 4, preferably, $X_3$ is independently of each other $C_{2-10}$ alkylene, more preferably $C_{2-4}$ alkylene, and most preferably propane-1,3-diyl.

Preferably, $Y_2$ is $C_{1-6}$ alkoxy, more preferably $C_{1-4}$ alkoxy, and most preferably methoxy.

Preferably, $R_7$ is independently of each other hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl.

Also preferably, $R_7$ is independently of each other $C_{1-10}$ alkyl, more preferably $C_{1-6}$ alkyl, still more preferably $C_{1-3}$ alkyl, most preferably methyl.

Also preferably, n3 is i) an integer of 30 to 60, ii) an integer of 20 or more, 25 or more, or 30 or more, 40 or less, or 35 or less, or iii) an integer of 50 or more, or 55 or more, 70 or less, 65 or less, or 60 or less.

Also preferably, Chemical Formula 4 is represented by the following Chemical formula 4-1:

[Chemical Formula 4-1]

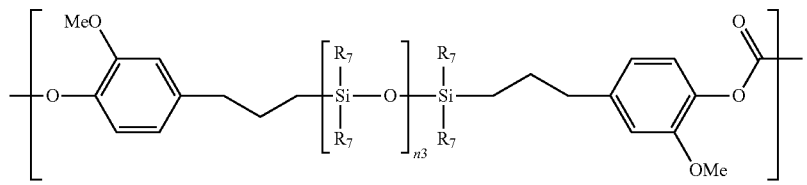

Particularly, the present invention is characterized by including one or more, or two or more, specifically two or more repeating units selected from the group consisting of the repeating units represented by Chemical Formula 2 to 4.

It is confirmed that when two or more of the repeating units represented by Chemical Formula 2 to 4 are included, the improvement degrees of physical properties such as impact strength at room temperature, impact strength at low temperature, and flowability are significantly increased, which is resulted from the fact that the action of the improvement degrees of the physical properties are complementary to each other by each repeating unit.

The phrase 'two or more repeating units' described herein refers to two or more repeating units having different structures being included, or two or more repeating units having the same structure, but the different number of the repeating units (n1, n2, n3) of silicon oxide in the structure of Chemical Formula 2 to 4 being included.

Specifically, the phrase 'two or more repeating units' described herein refers to include 1) one repeating unit represented by Chemical Formula 2 and one repeating unit represented by Chemical Formula 3, 2) one repeating unit represented by Chemical Formula 2 and one repeating unit represented by Chemical Formula 4, or 3) one repeating unit represented by chemical Formula 3 and one repeating unit represented by Chemical Formula 4.

In each case including two repeating units such as A) one repeating unit represented by Chemical Formula 2 and one repeating unit represented by Chemical Formula 3, B) one repeating unit represented by Chemical Formula 2 and one repeating unit represented by Chemical Formula 4, or B) one repeating unit represented by chemical Formula 3 and one repeating unit represented by Chemical Formula 4, as the two or more repeating units, a weight ratio between the two repeating units may be 1:99 to 99:1.

Preferably, it is 3:97 to 97:3, 5:95 to 95:5, 10:90 to 90:10, or 15:85 to 85:15, more preferably 20:80 to 80:20. The repeating units represented by Chemical Formula 2 to 4 are derived from a siloxane compound represented by the following Chemical Formula 2-2, a siloxane compound represented by the following Chemical Formula 3-2, and a siloxane compound represented by the following Chemical Formula 4-2, respectively.

[Chemical Formula 2-2]

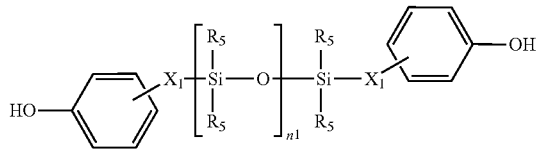

wherein
$X_1$, $R_5$ and n1 are as defined in the above Chemical Formula 2,

[Chemical Formula 3-2]

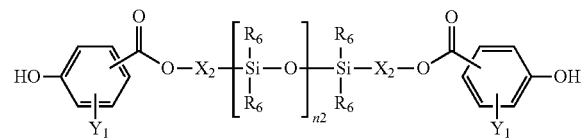

wherein
$X_2$, $Y_1$, $R_6$ and n2 are as defined in the above Chemical Formula 3,

[Chemical Formula 4-2]

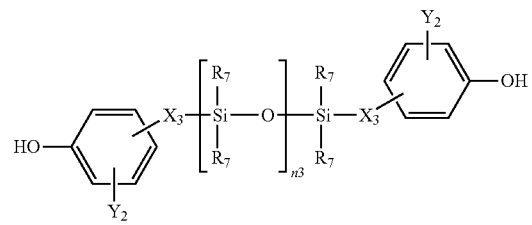

wherein
$X_3$, $Y_2$, $R_7$ and n3 are as defined in the above Chemical Formula 4.

The phrase 'derived from a siloxane compound' refers to forming the repeating unit represented by each of Chemical Formula 2 to 4 by reacting the hydroxy group of each siloxane compound and the carbonate precursor.

Further, the carbonate precursor which may be used in the formation of the repeating units of Chemical formula 2 to 4 is as described in the carbonate precursor which may be used in the formation of the repeating unit of the above Chemical Formula 1.

Further, the compounds represented by Chemical Formula 2-2, 3-2 and 4-2 may be prepared by the method of the following Reaction Formula 1 to 3.

[Reaction Formula 1]

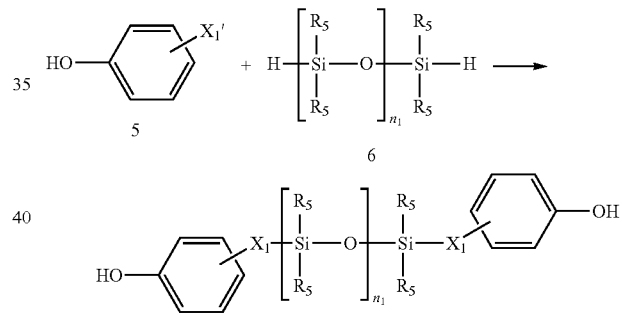

wherein
$X_1'$ is $C_{2-10}$ alkenyl, and $X_1$, $R_5$ and n1 are as defined in the above Chemical Formula 1,

[Reaction Formula 2]

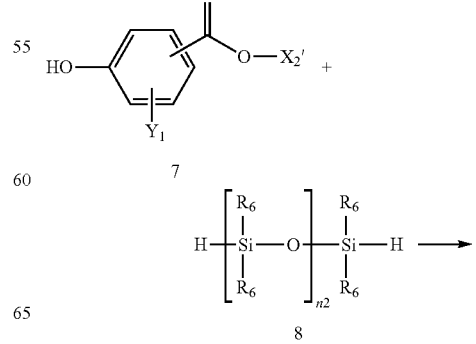

-continued

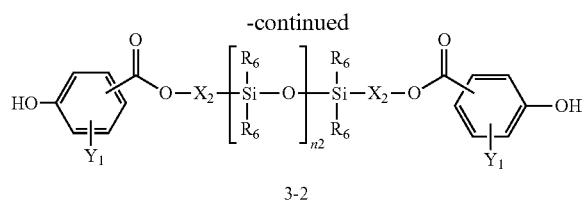

3-2 wherein $X_2'$ is $C_{2-10}$ alkenyl, and $X_2$, $Y_1$, $R_6$ and n2 are as defined in the above Chemical formula 2,

[Reaction Formula 3]

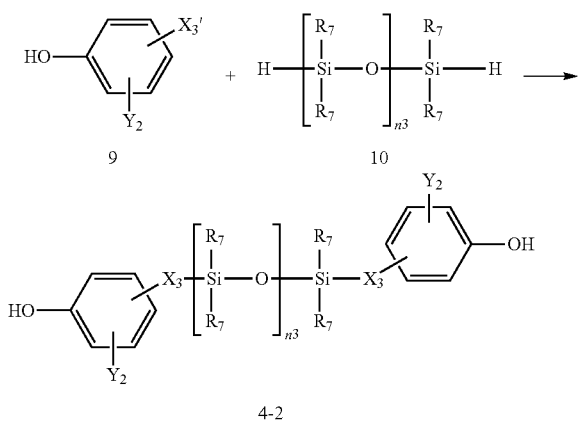

4-2 wherein $X_3'$ is $C_{2-10}$ alkenyl, and $X_3$, $Y_2$, $R_7$ and n3 are as defined in the above Chemical Formula 3. It is preferred that the reactions of Reaction Formula 1 to 3 are carried out under a metal catalyst.

It is preferred to use a Pt catalyst as the metal catalyst, and as the Pt catalyst, one or more selected from the group consisting of an Ashby catalyst, a Karstedt catalyst, a Lamoreaux catalyst, a Speier catalyst, $PtCl_2(COD)$, $PtCl_2$(benzonitrile)$_2$, and $H_2PtBr_6$. The metal catalyst may be used at 0.001 parts by weight or more, 0.005 parts by weight or more, or 0.01 parts by weight or more, 1 part by weight or less, 0.1 parts by weight or less, or 0.05 parts by weight or less, based on 100 parts by weight of the compound represented by Chemical Formula 6, 8 or 10.

Further, it is preferred that the reaction temperature is 80 to 100° C. Further, it is preferred that the reaction time is 1 to 5 hours.

Further, the compound represented by Chemical Formula 6, 8 or 10 may be prepared by reacting organodisiloxane and organocyclosiloxane under an acid catalyst, and n1, n2 and n3 may be adjusted by controlling the contents of the reactants. It is preferred that the reaction temperature is 50 to 70° C. Further, it is preferred that the reaction time is 1 to 6 hours.

As the organodisiloxane, one or more selected from the group consisting of tetramethyldisiloxane, tetraphenyldisiloxane hexamethyldisiloxane and hexaphenyldisiloxane may be used. Further, as the organocyclosiloxane, for example, organocyclotetrasiloxane may be used, which may be exemplified as octamethylcyclotetrasiloxane, octaphenylcyclotetrasiloxane and the like.

The organodisiloxane may be used at 0.1 parts by weight or more, or 2 parts by weight or more, 10 parts by weight or less, or 8 parts by weight or less, based on 100 parts by weight of the organocyclosiloxane.

As the acid catalyst, one or more selected from the group consisting of $H_2SO_4$, $HClO_4$, $AlO_3$, $SbCl_5$, $SnCl_4$ and acid clay may be used. Further, the acid catalyst may be used at 0.1 parts by weight or more, 0.5 parts by weight or more, or 1 part by weight or more, 10 parts by weight or less, 5 parts by weight or less, or 3 parts by weight or less, based on 100 parts by weight of the organocyclosiloxane.

Particularly, the physical properties of copolycarbonate may be improved by adjusting the contents of the repeating units represented by Chemical Formula 1 to 3, and the weight ratio of the repeating units corresponds to, for example, the weight ratio of the siloxane compounds represented by Chemical Formula 1-2, 2-2 and 3-2.

Copolycarbonate Resin

The copolycarbonate resin composition may include a copolycarbonate resin including an aromatic polycarbonate-based first repeating unit and an aromatic polycarbonate-based second repeating unit having at least one siloxane bond.

In the copolycarbonate resin including the aromatic polycarbonate-based first repeating unit and the aromatic polycarbonate-based second repeating unit having at least one siloxane bond, a mole ratio of the aromatic polycarbonate-based first repeating unit and the aromatic polycarbonate-based second repeating unit having at least one siloxane bond may be 1:0.0001 to 1:0.01, or 1:0.0005 to 1:0.008, or 1:0.001 to 1:0.006, and a weight ratio thereof may be 1:0.001 to 1:1, or 1:0.005 to 1:0.1, or 1:0.01 to 1:0.03.

Further, the copolycarbonate resin including the aromatic polycarbonate-based first repeating unit and the aromatic polycarbonate-based second repeating unit having at least one siloxane bond may include 0.001 to 10 wt % of the second repeating unit. In the case that the content of the second repeating unit is unduly reduced, it may be difficult to sufficiently implement improving the physical properties such as impact strength at room temperature, impact strength at low temperature and flowability by the second repeating unit. However, in the case that the content of the second repeating unit is unduly increased, the molecular weight of the copolycarbonate resin is excessively increased, and thus, flowability and molding processability may be reduced.

The copolycarbonate resin including the aromatic polycarbonate-based first repeating unit and the aromatic polycarbonate-based second repeating unit having at least one siloxane bond may have a weight average molecular weight of 1,000 to 100,000 g/mol, or 5,000 to 50,000 g/mol. Within the weight average molecular weight range, the ductility and YI of the copolycarbonate resin may be improved.

The copolycarbonate resin may be prepared by a preparation method including polymerizing one or more, or two or more compounds selected from the group consisting of the compounds represented by Chemical Formula 2-2 to 4-2 with a composition including an aromatic diol compound and a carbonate precursor.

The aromatic diol compound and the carbonate precursor are as described in detail in the aromatic polycarbonate-based first repeating unit.

As the polymerization method, for example, an interfacial polymerization method may be used, and in this case, the polymerization reaction may be carried out at low temperature under normal pressure, and the molecular weight may be easily controlled. It is preferred that the interfacial polymerization is carried out in the presence of an acid binder and an organic solvent. Further, the interfacial polymerization may include, for example, adding a coupling agent after pre-polymerization, and then carrying out polymerization again, and in this case, high molecular weight copolycarbonate may be obtained.

The materials used in the interfacial polymerization are not particularly limited as long as they may be used in the polymerization of copolycarbonate, and the used amount thereof may be adjusted as required.

As the acid binder, for example, alkali metal hydroxides such as sodium hydroxide, potassium hydroxide, or an amine compound such as pyridine may be used.

The organic solvent is not particularly limited as long as it is generally used in the polymerization of copolycarbonate, and for example, halogenated hydrocarbons such as methylene chloride and chlorobenzene may be used.

Further, in the interfacial polymerization, a reaction accelerator such as a tertiary amine compound, a quaternary ammonium compound, and quaternary phosphonium compound such as trimethylamine, tetra-n-butylammonium bromide and tetra-n-butylphosphonium bromide, and the like may be further used, for promoting the reaction.

It is preferred that the reaction temperature of the interfacial polymerization is 0 to 40° C., and the reaction time is 10 minutes to 5 hours. Further, it is preferred that pH is maintained at 9 or more, or 11 or more during the interfacial polymerization.

Further, the interfacial polymerization may be carried out by further including a molecular weight regulator. The molecular weight regulator may be added before, during or after initiating polymerization.

As the molecular weight regulator, mono-alkylphenol may be used, and the mono-alkylphenol is, for example, one or more selected from the group consisting of p-test-butyl phenol, p-cumyl phenol, decyl phenol, dodecyl phenol, tetradecyl phenol, hexadecyl phenol, octadecyl phenol, eicosyl phenol, docosyl phenol and triacontylphenol, preferably p-tert-butylphenyl, and in this case, a molecular weight control effect is significant.

The molecular weight regulator is included for example, at 0.01 parts by weight or more, 0.1 parts by weight or more, or 1 part by weight or more, 10 parts by weight or less, 6 parts by weight or less, or 5 parts by weight or less, based on 100 parts by weight of the aromatic diol compound, and within this range, the molecular weight to be desired may be obtained.

By the polymerization, one or more, or two or more compounds selected from the group consisting of Chemical Formula 2-2 to 4-2 and the aromatic diol compound may form the repeating units represented by Chemical Formula 1 to 4.

Specifically, the repeating units represented by Chemical Formula 1 to 4 may be formed by reacting one or more, or two or more compounds selected from the group consisting of the compounds represented by Chemical Formula 2-2 to 4-2, the hydroxy group of the aromatic diol compound, and the carbonate precursor.

Preferably, the copolycarbonate resin according to the present invention may include the copolycarbonate resin including the repeating unit represented by Chemical Formula 1-1, the repeating unit represented by Chemical Formula 2-2, and the repeating unit represented by Chemical Formula 3-2.

Particularly, in the case of the copolycarbonate including the repeating unit represented by Chemical Formula 2 and the repeating unit represented by Chemical Formula 3 as the aromatic polycarbonate-based first repeating unit together with the aromatic polycarbonate-based second repeating unit having at least one siloxane bond, the impact strength at low temperature and flowability of the copolycarbonate resin may be improved at the same time, by adjusting the contents of the repeating unit represented by Chemical Formula 2 and the repeating unit represented by Chemical Formula 3.

Polysiloxane Polymer

The copolycarbonate resin composition may include the polysiloxane polymer containing a hydrocarbon-based functional group having 2 or more, or 2 to 500, or 2 to 100, or 2 to 50 carbon atoms. The polysiloxane polymer containing the hydrocarbon-based functional group having 2 or more carbon atoms may form a crosslinked structure through a hydrocarbon-based functional group having 2 or more carbon atoms, thereby serving to absorb external impact, as well as being chemically stable to significantly increase chemical resistance.

The hydrocarbon-based functional group having 2 or more carbon atoms may include one or more selected from the group consisting of an aliphatic hydrocarbon functional group, a cycloaliphatic hydrocarbon functional group and an aromatic hydrocarbon functional group. The aliphatic hydrocarbon functional group, cycloaliphatic hydrocarbon functional group, or aromatic hydrocarbon functional group may be unsubstituted or substituted by one or more substituents selected from the group consisting of a halogen group, an alkyl group, an alkenyl group, an alkoxy group, an aryl group, an arylalkyl group, an arylalkenyl group, a heterocyclic group, a carbozolyl group, a fluorenyl group, a nitrile group and an acetylene group.

The cycloaliphatic hydrocarbon functional group may include a monocyclic or polycyclic cycloalkyl group having 3 or more, or 3 to 50 carbon atoms, and the aromatic hydrocarbon functional group may include a monocyclic or polycyclic aryl group having 6 or more, or 6 to 50 carbon atoms. The monocycle refers to a single ring contained in the functional group, and the polycycle refers to two or more rings contained in the functional group.

The aliphatic hydrocarbon functional group may include a straight chain or branched chain alkyl group or vinyl-based functional group. The straight chain or branched chain alkyl group having 2 or more carbon atoms refers to an alkyl group except a methyl group having one carbon atom.

The vinyl-based functional group includes a vinyl group or a functional group derived from a vinyl group, and the vinyl group is represented by —CH=CH$_2$, and refers to a functional group in which one hydrogen atom is removed from an ethylene (H$_2$C=CH$_2$) molecule. The functional group derived from a vinyl group refers to a functional group in which some hydrogen atoms contained in the vinyl group are replaced with other atomic groups.

Specifically, the vinyl-based functional group may be represented by the following Chemical Formula 11.

[Chemical Formula 11]

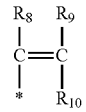

wherein

* denotes a bonding position, and $R_8$, $R_9$, and $R_{10}$ are independently of each other hydrogen, a straight chain or branched chain alkyl group having 1 to 20 carbon atoms, an aryl group having 6 to 20 carbon atoms, an alkenyl group having 2 to 20 carbon atoms, an alkoxy group having 1 to 20 carbon atoms, a cycloalkyl group having 3 to 20 carbon atoms, a ketone group or an ester group.

Each of the straight chain or branched chain alkyl group having 1 to 20 carbon atoms, aryl group having 6 to 20 carbon atoms, alkenyl group having 2 to 20 carbon atoms, alkoxy group having 1 to 20 carbon atoms, cycloalkyl group having 3 to 20 carbon atoms, ketone group or ester group may be unsubstituted or substituted with one or more substituents selected from the group consisting of a halogen group, an alkyl group, an alkenyl group, an alkoxy group, an aryl group, an arylalkyl group, an arylalkenyl group, a heterocyclic group, a carbazolyl group, a fluorenyl group, a nitrile group and an acetylene group.

The aryl group may be monocyclic or polycyclic which is an organic radical derived from an aromatic hydrocarbon by removal of one hydrogen. The cycloalkyl group is not particularly limited, but may be monocyclic or polycyclic.

The polysiloxane polymer containing the hydrocarbon-based functional group having 2 or more carbon atoms may include 0.001 to 10 mol %, or 0.01 to 1 mol %, or 0.05 to 0.5 mol % of the hydrocarbon-based functional group having 2 or more carbon atoms. If the hydrocarbon-based functional group having 2 or more carbon atoms accounts for less than 0.001 mol %, relative to the polysiloxane polymer containing the hydrocarbon-based functional group having 2 or more carbon atoms, it may be difficult to implement the effect of improving the impact resistance, chemical resistance and flowability by the hydrocarbon-based functional group having 2 or more carbon atoms, and if the hydrocarbon-based functional group having 2 or more carbon atoms accounts for more than 10 mol %, relative to the polysiloxane polymer containing the hydrocarbon-based functional group having 2 or more carbon atoms, the amount of the hydrocarbon-based functional group having 2 or more carbon atoms having high reactivity is too large, and thus, the compatibility with the polymer resin is deteriorated, thereby lowering the mechanical properties or chemical properties.

The polysiloxane polymer containing the hydrocarbon-based functional group having 2 or more carbon atoms may include the polysiloxane repeating unit including the hydrocarbon-based functional group having 2 or more carbon atoms and the polydimethylsiloxane repeating unit.

Specifically, the polysiloxane repeating unit including the hydrocarbon-based functional group having 2 or more carbon atoms may include the repeating unit represented by the following Chemical Formula 12:

[Chemical Formula 12]

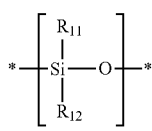

wherein

* denotes a bonding position, and at least one of $R_{11}$ and $R_{12}$ is a hydrocarbon-based functional group having 2 or more carbon atoms, and the other one is a methyl group.

More specifically, in Chemical Formula 12, $R_{11}$ may be the hydrocarbon-based functional group having 2 or more carbon atoms, and $R_{12}$ may be a methyl group. The hydrocarbon-based functional group having 2 or more carbon atoms is as described in detail in the polysiloxane polymer above.

The polydimethylsiloxane repeating unit may include the repeating unit represented by the following Chemical Formula 13:

[Chemical Formula 13]

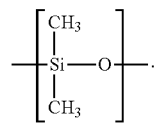

The mole ratio of the polysiloxane repeating unit including the hydrocarbon-based functional group having 2 or more carbon atoms to the polydimethylsiloxane repeating unit may be 0.00001 to 0.1, or 0.0005 to 0.01, or 0.0007 to 0.001.

The polysiloxane polymer containing the hydrocarbon-based functional group having 2 or more carbon atoms may further include the hydrocarbon-based functional group having 2 or more carbon atoms bonded to the end of the polysiloxane polymer.

The end of the polysiloxane polymer refers to the both ends of the polysiloxane main chain of the polysiloxane polymer containing the hydrocarbon-based functional group having 2 or more carbon atoms, and the hydrocarbon-based functional group having 2 or more carbon atoms may bond to both ends or any one end of the polysiloxane main chain. The hydrocarbon-based functional group having 2 or more carbon atoms is as described in detail in the polysiloxane polymer above.

That is, the polysiloxane polymer containing the hydrocarbon-based functional group having 2 or more carbon atoms may include the polysiloxane repeating unit including the hydrocarbon-based functional group having 2 or more carbon atoms, the main chain including the polydimethylsiloxane repeating unit, and the hydrocarbon-based functional group having 2 or more carbon atoms bonded to the end of the main chain.

Specifically, the polysiloxane polymer containing the hydrocarbon-based functional group having 2 or more carbon atoms may include the compound represented by the following Chemical formula 14:

[Chemical Formula 14]

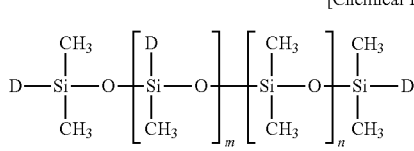

wherein m is an integer of 10 to 20, n is an integer of 6,000 to 11,500, and D is a hydrocarbon-based functional group having 2 or more carbon atoms. The hydrocarbon-based functional group having 2 or more carbon atoms is as described in detail in the polysiloxane polymer above.

The content of the polysiloxane polymer containing the hydrocarbon-based functional group having 2 or more carbon atoms may be 0.01 wt % to 10 wt %, or 0.1 wt % to 5 wt %, or 0.5 wt % to 4 wt %, based on the total weight of the copolycarbonate resin composition.

If the content of the polysiloxane polymer containing the hydrocarbon-based functional group having 2 or more carbon atoms is unduly small, it may be difficult to implement the effect of improving the chemical resistance and impact resistance by the polysiloxane polymer containing the hydrocarbon-based functional group having 2 or more carbon atoms.

Further, if the content of the polysiloxane polymer containing the hydrocarbon-based functional group having 2 or more carbon atoms is unduly large, the mechanical or chemical properties of the copolycarbonate resin composition may be deteriorated.

The polysiloxane polymer containing the hydrocarbon-based functional group having 2 or more carbon atoms may have a weight average molecular weight of 100,000 to 1,000,000 g/mol, or 300,000 to 900,000 g/mol, or 500,000 to 850,000 g/mol.

The example of measuring the weight average molecular weight is not significantly limited, however, for example, the weight average molecular weight in terms of polystyrene measured by GPC may be used.

Copolycarbonate Resin Composition

The copolycarbonate resin composition may include a copolycarbonate resin including an aromatic polycarbonate-based first repeating unit and an aromatic polycarbonate-based second repeating unit having at least one siloxane bond; and a polysiloxane polymer containing a hydrocarbon-based functional group having 2 or more carbon atoms.

The example of preparing the copolycarbonate resin composition is not significantly limited, however, for example, a method of mixing the copolycarbonate resin and the polysiloxane polymer may be listed.

Specifically, as the example of mixing the copolycarbonate resin and the polysiloxane polymer, a method of adding the polysiloxane polymer to the copolycarbonate resin, and then carrying out mixing using a mixer, or carrying out extrusion molding the mixture with an extruder to prepare a master batch may be listed. The example of the master batch form is not limited, however, for example, it may have a pellet form.

Further, the copolycarbonate resin composition may further include various kinds of additives, resins and the like which are known to the art, depending on the purpose of the finally manufactured article. As the example of the additives, one or more selected from the group consisting of an anti-oxidant, a thermal stabilizer, a photostabilizer, a plasticizer, an anti-static agent, a nucleating agent, a flame retardant, a lubricant, an impact enhancer, an optical brightener, an UV absorber, a pigment, and a dye may be listed.

The copolycarbonate resin composition may have impact strength at low temperature measured at −30° C. according to ASTM D256 (⅛ inch, Notched Izod) of 700 J/m or more. Further, the copolycarbonate resin composition may have impact strength at low temperature measured at −40° C. according to ASTM D256 (⅛ inch, Notched Izod) of 200 J/m or more.

Further, the copolycarbonate resin composition may have a melt flow rate measured according to ASTM D1238 (300° C., 1.2 kg condition) less than 10 g/10 min.

Meanwhile, according to another embodiment of the present invention, an article including the copolycarbonate resin composition of the embodiment may be provided.

Preferably, the article is an injection molded article. Further, the article may further include for example, one or more selected from the group consisting of an anti-oxidant, a thermal stabilizer, a photostabilizer, a plasticizer, an anti-static agent, a nucleating agent, a flame retardant, a lubricant, an impact enhancer, an optical brightener, an UV absorber, a pigment, and a dye.

The example of the method of manufacturing the article is not significantly limited, however, may include a step of drying the copolycarbonate resin composition according to the present invention, for example, the copolycarbonate resin composition in a pellet form, and then injecting it with an injection molding machine.

As to the copolycarbonate resin composition, the description in the above embodiment may be referred.

According to the present invention, a copolycarbonate resin composition having improved mechanical properties such as impact resistance and chemical resistance while maintaining resin flowability, and an article including the same may be provided.

DETAILED DESCRIPTION OF THE EMBODIMENTS

The present invention will be described in detail in the following Examples. However, the following Examples only illustrate the present invention, and the description of the present invention is not limited by the following Examples.

Preparation Examples 1 to 4

Preparation Example 1: Preparation of Polyorganosiloxane (AP-PDMS, n1=34)

47.6 g (160 mmol) of octamethylcyclotetrasiloxane and 2.4 g (17.8 mmol) of tetramethyldisiloxane were mixed, and then the mixture was added to a 3 L flask together with 1 part by weight of acid clay (DC-A3) relative to 100 parts by weight of octamethylcyclotetrasiloxane, and reacted at 60° C. for 4 hours. After completing the reaction, it was diluted with ethyl acetate, and rapidly filtered using celite. The number of the thus-obtained repeating unit (n1) of unmodified polyorganosiloxane was 34 as confirmed by $^1$H NMR.

To the obtained end-unmodified polyorganosiloxane, 4.81 g (35.9 mmol) of 2-allylphenol and 0.01 g (50 ppm) of Karstedt's platinum catalyst were added, and reacted at 90° C. for 3 hours. After completing the reaction, unreacted siloxane was evaporated under a condition of 120° C. and 1 torr, thereby being removed. The thus-obtained end-modified polyorganosiloxane was named as AP-PDMS (n1=34). AP-PDMS was light yellow oil, the number of the repeating unit (n1) was 34, as confirmed by $^1$H NMR using Varian 500 MHz, and no further purification was needed.

Preparation Example 2: Preparation of Polyorganosiloxane (MBHB-PDMS, n2=58)

47.60 g (160 mmol) of octamethylcyclotetrasiloxane, and 1.5 g (11 mmol) of tetramethyldisiloxane were mixed, and then the mixture was added to a 3 L flask together with 1 part by weight of acid clay (DC-A3) relative to 100 parts by weight of octamethylcyclotetrasiloxane, and reacted at 60° C. for 4 hours. After completing the reaction, it was diluted with ethyl acetate, and rapidly filtered using celite. The number of the thus-obtained repeating unit (n2) of end-unmodified polyorganosiloxane was 58 as confirmed by $^1$H NMR.

To the obtained end-unmodified polyorganosiloxane, 6.13 g (29.7 mmol) of 3-methylbut-3-enyl 4-hydroxybenzoate, and 0.01 g (50 ppm) of Karstedt's platinum catalyst were added, and reacted at 90° C. for 3 hours. After completing the reaction, unreacted siloxane was evaporated under a condition of 120° C. and 1 torr, thereby being removed. The thus-obtained end-modified polyorganosiloxane was named as MBHB-PDMS (n2=58). MBHB-PDMS was light yellow oil, the number of the repeating unit (n2) was 58, as confirmed by ¹H NMR using Varian 500 MHz, and no further purification was needed.

Preparation Example 3: Preparation of Copolycarbonate Resin 1784 g of water, 385 g of NaOH, and 232 g of BPA (bisphenol A) were added to a polymerization reactor, and mixed and dissolved under $N_2$ atmosphere. A mixed solution of 4.3 g of PTBP (para-tert butylphenol), 4.73 g of AP-PDMS (n1=34) prepared in the Preparation Example 1, and 0.53 g of MBHB-PDMS (n2=58) prepared in the Preparation Example 2 was dissolved with MC (methylene chloride), and added thereto. Next, 128 g of TPG (triphosgene) was dissolved in MC to maintain the pH at 11 or more, added for 1 hour to be reacted, and then after 10 minutes, 46 g of TEA (triethylamine) was added thereto, thereby carrying out a coupling reaction. After a total reaction time of 1 hour and 20 minutes, pH was lowered to 4, thereby removing TEA, and the pH of the produced polymer was adjusted to neutral at pH 6-7 by washing with distilled water three times. The thus-obtained polymer was reprecipitated in a mixed solution of methanol and hexane, and dried at 120° C., thereby obtaining a final copolycarbonate resin.

Preparation Example 4: Preparation of Polycarbonate Resin 1784 g of water, 385 g of NaOH, and 232 g of BPA (bisphenol A) were added to a polymerization reactor, and mixed and dissolved under $N_2$ atmosphere. Next, 128 g of TPG (triphosgene) was dissolved in MC to maintain the pH at 11 or more, added for 1 hour to be reacted, and then after 10 minutes, 46 g of TEA (triethylamine) was added thereto, thereby carrying out a coupling reaction. After a total reaction time of 1 hour and 20 minutes, pH was lowered to 4, thereby removing TEA, and the pH of the produced polymer was adjusted to neutral at pH 6-7 by washing with distilled water three times. The thus-obtained polymer was reprecipitated in a mixed solution of methanol and hexane, and dried at 120° C., thereby obtaining a final copolycarbonate resin.

Preparation Example 5: Preparation of Copolycarbonate Resin 1784 g of water, 385 g of NaOH, and 232 g of BPA (bisphenol A) were added to a polymerization reactor, and mixed and dissolved under $N_2$ atmosphere. 4.3 g of PTBP (para-tert butylphenol) and 4.73 g of AP-PDMS (n1=34) prepared in Preparation Example 1 were dissolved with MC (methylene chloride) and added thereto. Next, 128 g of TPG (triphosgene) was dissolved in MC to maintain the pH at 11 or more, added for 1 hour to be reacted, and then after 10 minutes, 46 g of TEA (triethylamine) was added thereto, thereby carrying out a coupling reaction. After a total reaction time of 1 hour and 20 minutes, pH was lowered to 4, thereby removing TEA, and the pH of the produced polymer was adjusted to neutral at pH 6-7 by washing with distilled water three times. The thus-obtained polymer was reprecipitated in a mixed solution of methanol and hexane, and dried at 120° C., thereby obtaining a final copolycarbonate resin.

Examples 1 to 3: Preparation of Copolycarbonate Resin Composition

Example 1

To the copolycarbonate resin prepared in the Preparation Example 3, SF3900C (KCC, vinyl group content: 0.07 mol %) was added at a content of 1 wt %, and mixed with a mixer.

Thereafter, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritol tetrastearate relative to 1 parts by weight of the copolycarbonate resin composition were added thereto, and extruded at 300° C. using a vent attached Φ30 mm twin-screw extruder, thereby preparing a copolycarbonate resin composition in a pellet form.

Example 2

A copolycarbonate resin composition was prepared in the same manner as in Example 1, except that SF3900C (KCC, vinyl group content: 0.07 mol %) was added at a content of 2 wt %.

Example 3

A copolycarbonate resin composition was prepared in the same manner as in Example 1, except that SF3900C (KCC, vinyl group content: 0.07 mol %) was added at a content of 3 wt %.

Comparative Examples 1 to 4: Preparation of Copolycarbonate Resin Composition and Article

Comparative Example 1

A copolycarbonate resin composition was prepared in the same manner as in Example 1, except that SF3900C (KCC, vinyl group content: 0.07 mol %) was not added.

Comparative Example 2

A copolycarbonate resin composition was prepared in the same manner as in Example 1, except that SF3900C (KCC, vinyl group content: 0.07 mol %) was not added, and the polycarbonate resin prepared in Preparation Example 4 was used instead of the copolycarbonate resin prepared in Preparation Example 3.

Comparative Example 3

The copolycarbonate resin prepared in Preparation Example 5 was used.

Comparative Example 4

A copolycarbonate resin composition was prepared in the same manner as in Example 1, except that the polycarbonate resin prepared in Preparation Example 4 was used instead of the copolycarbonate resin prepared in Preparation Example 3.

Experimental Example: Measurement of Physical Properties of Copolycarbonate Resin Composition Obtained in Examples and Comparative Examples The copolycarbonate resin compositions obtained in the Examples and Comparative Examples were subjected to injection molding at a cylinder temperature of 300° C., and a mold temperature of 80° C., using an N-20C injection molding machine from JSW, Ltd., thereby manufacturing specimens.

Thereafter, the physical properties of the specimens were measured by the following methods, and the results are shown in Table 1.

1. Melt flow rate (MFK)

It was measured according to ASTM D1238 (300° C., 1.2 kg condition).

2. Weight average molecular weight

It was measured by GPC using a PC standard, using Agilent 1200 series.

3. Impact strength at low temperature 3-1. Impact strength at −30° C. (J/m)

It was measured −30° C. according to ASTM D256 (⅛ inch, Notched Izod).

3-2. Impact strength at −40° C. (J/m)

It was measured −40° C. according to ASTM D256 (¼ inch, Notched Izod).

4. Chemical resistance

A specimen (thickness: 3.2 mm) for measuring tensile strength was manufactured according to ASTM D638, and the chemical resistance was measured based on JIG Strain R1.0 according to ASTM D543 (PRACTICE B).

Specifically, a cotton cloth (2 cm×2 cm) was placed on the center of the specimen at room temperature (23° C.), and the time taken from the moment when 2 ml of a solvent (Nivea®, aqua protect sun spray—SPF 30, manufactured by Beiersdorf AG) was dropped to the cloth, to the point when each specimen was broken was measured, and evaluation was carried out, under the following criteria:

◉: 24 hours or more
○: 1 to 24 hours
Δ: 1 minute to 1 hour
x: 1 minute or less

As shown in above Table 1, in the case of the copolycarbonate resin compositions of the Examples including the additive, it was confirmed that the time to be modified by the solvent is long, being 1 hour or more, and thus, the chemical resistance is excellent, however, in the case of the copolycarbonate resin compositions of Comparative Examples without the additive, the time to be modified by the solvent is short, being less than 1 hour, and thus, the chemical resistance was poorer than that of Examples.

In addition, when comparing the copolycarbonate resin compositions of Examples 1 to 3 with the copolycarbonate resin composition of Comparative Example 1, it was confirmed that those compositions identically include the silicon-containing copolycarbonate resin prepared in Preparation Example 3, however, the compositions of Examples 1 to 3 to which an additive is further added have increased values of the impact strength at low temperature. Further, as a result of including the silicon-containing copolycarbonate resin of Preparation Example 3 identically, the melt flow rate property was measured at the same level.

In the case of the copolycarbonate resin composition of Comparative Example 3, as it includes only the copolycarbonate resin prepared in Preparation Example 5 without an additive, it had low impact strength at low temperature, a high melt flow rate, and poor chemical resistance, as compared with that of Examples.

In the case of the copolycarbonate resin composition of Comparative Example 4, though it includes an additive together with the copolycarbonate resin prepared in Preparation Example 4, it used the polycarbonate resin obtained in Preparation Example 4, and thus, the impact strength at low temperature at ⅛ inch, −30° C. was measured to be lower, and the melt flow rate was found to be higher than those of Examples.

Accordingly, it was confirmed that the copolycarbonate resin composition includes a certain copolycarbonate resin and an additive, thereby having increased impact resistance

TABLE 1

Compositions of Examples and Comparative Examples and Results of Experimental Example

| Classification | | Example 1 | Example 2 | Example 3 | Comparative Example 1 | Comparative Example 2 | Comparative Example 3 | Comparative Example 4 |
|---|---|---|---|---|---|---|---|---|
| PC | | Preparation Example 3 | Preparation Example 3 | Preparation Example 3 | Preparation Example 3 | Preparation Example 4 | Preparation Example 5 | Preparation Example 4 |
| Additive | | SF3900C (1 wt %) | SF3900C (2 wt %) | SF3900C (3 wt %) | — | — | — | SF3900C (2 wt %) |
| Melt flow rate (g/10 min) | | 7 | 8 | 9 | 7 | 11 | 10 | 12 |
| Impact strength at low temperature (J/m) | ⅛ inch, −30° C. | 747 | 750 | 740 | 731 | 136 | 638 | 580 |
| | ¼ inch, −40° C. | 225 | 253 | 282 | 190 | 113 | 123 | 260 |
| molecular weight | | 30,600 | 30,500 | 30,700 | 30,500 | 28,100 | 29,300 | 28,300 |
| Chemical resistance | | ○ | ◉ | ◉ | Δ | X | X | ○ |

What is claimed is:

1. A copolycarbonate resin composition comprising:
   a copolycarbonate resin including an aromatic polycarbonate-based first repeating unit and one or more aromatic polycarbonate-based second repeating unit having at least one siloxane bond; and
   a polysiloxane polymer containing a hydrocarbon-based functional group having 2 or more carbon atoms, including a compound represented by the following Chemical Formula 14:

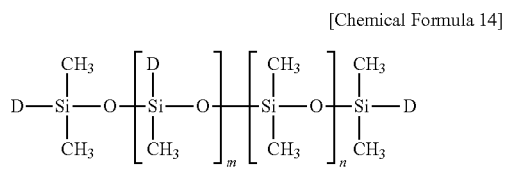

[Chemical Formula 14]

wherein m is an integer of 10 to 20, and n is an integer of 6000 to 11500, and
   D is a hydrocarbon-based functional group having 2 or more carbon atoms.

2. The copolycarbonate resin composition of claim 1, wherein the hydrocarbon-based functional group includes one or more selected from the group consisting of an aliphatic hydrocarbon functional group, a cycloaliphatic hydrocarbon functional group and an aromatic hydrocarbon functional group.

3. The copolycarbonate resin composition of claim 2, wherein the aliphatic hydrocarbon functional group includes a straight chain or branched chain alkyl group; or vinyl-based functional group.

4. The copolycarbonate resin composition of claim 3, wherein the vinyl-based functional group includes a functional group represented by the following Chemical Formula 11:

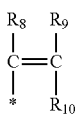

[Chemical Formula 11]

wherein * denotes a bonding position, and
   $R_8$, $R_9$ and $R_{10}$ are independently of one another, hydrogen; a straight chain or branched chain alkyl group having 1 to 20 carbon atoms; an aryl group having 6 to 20 carbon atoms; an alkenyl group having 2 to 20 carbon atoms; an alkoxy group having 1 to 20 carbon atoms; a cycloalkyl group having 3 to 20 carbon atoms; a ketone group; or an ester group.

5. The copolycarbonate resin composition of claim 1, wherein the polysiloxane repeating unit containing the hydrocarbon-based functional group having 2 or more carbon atoms includes a repeating unit represented by the following Chemical Formula 12:

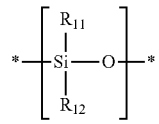

[Chemical Formula 12]

wherein * denotes a bonding position, and,
   at least one of $R_{11}$ and $R_{12}$ is a hydrocarbon-based functional group having 2 or more carbon atoms, and the other one is a methyl group.

6. The copolycarbonate resin composition of claim 1, wherein a content of the polysiloxane polymer containing the hydrocarbon-based functional group having 2 or more carbon atoms is 0.01 wt % to 10 wt %, based on a total weight of the copolycarbonate resin composition.

7. The copolycarbonate resin composition of claim 1, wherein the polysiloxane polymer containing the hydrocarbon-based functional group having 2 or more carbon atoms has a weight average molecular weight of 100,000 g/mol to 1,000,000 g/mol.

8. The copolycarbonate resin composition of claim 1, wherein the aromatic polycarbonate-based first repeating unit includes a repeating unit represented by the following Chemical Formula 1:

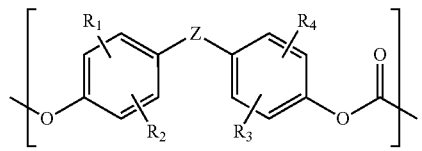

[Chemical Formula 1]

wherein $R_1$ to $R_4$ are independently of one another hydrogen, $C_{1-10}$ alkyl, $C_{1-10}$ alkoxy, or halogen, and
   Z is $C_{1-10}$ alkylene unsubstituted or substituted with phenyl; $C_{3-15}$ cycloalkylene unsubstituted or substituted with $C_{1-10}$ alkyl; O; S; SO; $SO_2$; or CO.

9. The copolycarbonate resin composition of claim 8, wherein the repeating unit represented by Chemical Formula 1 is derived from any one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)diphenyl methane.

10. The copolycarbonate resin composition of claim 8, wherein the repeating unit represented by Chemical Formula 1 is the following Chemical Formula 1-1:

[Chemical Formula 1-1]

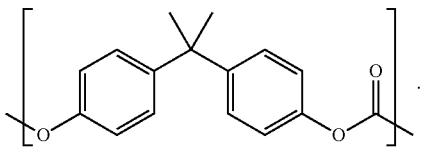

11. The copolycarbonate resin composition of claim 1, wherein the aromatic polycarbonate-based second repeating unit includes one or more repeating groups selected from the group consisting of repeating units represented by the following Chemical Formula 2 to 4:

[Chemical Formula 2]

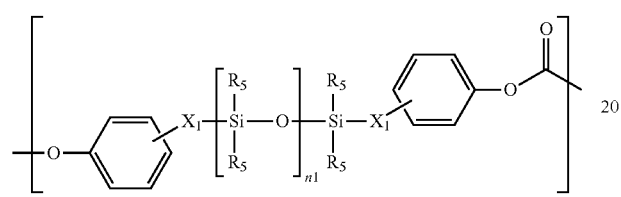

wherein $X_1$ is $C_{1-10}$ alkylene, $R_5$ is hydrogen; $C_{1-15}$ alkyl unsubstituted or substituted with oxiranyl, oxiranyl-substituted $C_{1-10}$ alkoxy or $C_{6-20}$ aryl; halogen; $C_{1-10}$ alkoxy; allyl; $C_{1-10}$ haloalkyl; or $C_{6-20}$ aryl, and n1 is an integer of 10 to 200,

[Chemical Formula 3]

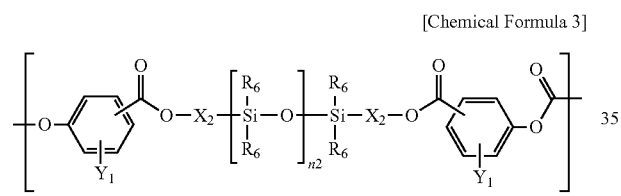

wherein $X_2$ is $C_{1-10}$ alkylene, $Y_1$ is hydrogen, $C_{1-6}$ alkyl, halogen, hydroxy, $C_{1-6}$ alkoxy or $C_{6-20}$ aryl, $R_6$ is hydrogen; $C_{1-15}$ alkyl unsubstituted or substituted with oxiranyl, oxiranyl-substituted $C_{1-10}$ alkoxy or $C_{6-20}$ aryl; halogen; $C_{1-10}$ alkoxy; allyl; $C_{1-10}$ haloalkyl; or $C_{6-20}$ aryl, and n2 is an integer of 10 to 200,

[Chemical Formula 4]

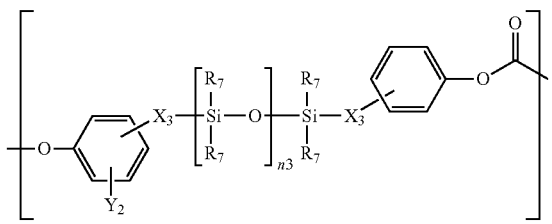

wherein $X_3$ is $C_{1-10}$ alkylene, $Y_2$ is $C_{1-10}$ alkoxy, $R_7$ is hydrogen; $C_{1-15}$ alkyl unsubstituted or substituted with oxiranyl, oxiranyl-substituted $C_{1-10}$ alkoxy or $C_{6-20}$ aryl; halogen; $C_{1-10}$ alkoxy; allyl; $C_{1-10}$ haloalkyl; or $C_{6-20}$ aryl, and n3 is an integer of 10 to 200.

12. The copolycarbonate resin composition of claim 11, wherein the repeating unit represented by Chemical Formula 2 is the following Chemical Formula 2-1:

[Chemical Formula 2-1]

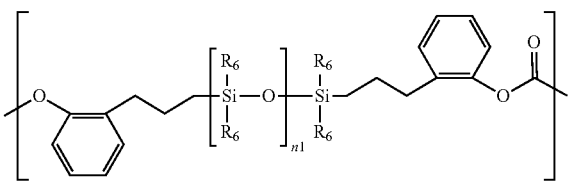

13. The copolycarbonate resin composition of claim 11, wherein the repeating unit represented by Chemical Formula 3 is the following Chemical Formula 3-1:

[Chemical Formula 3-1]

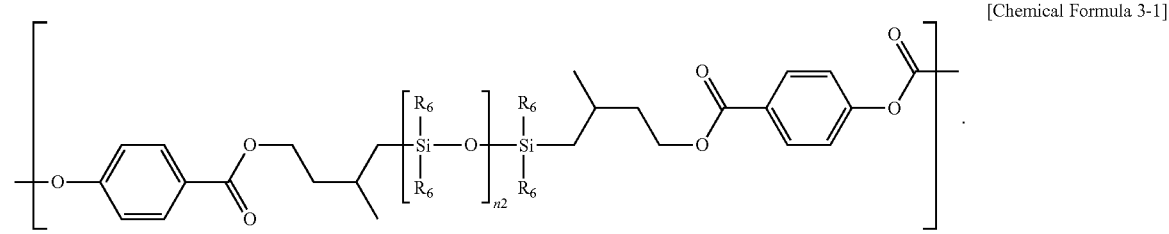

14. The copolycarbonate resin composition of claim 11, wherein the repeating unit represented by Chemical Formula 4 is the following Chemical Formula 4-1:

[Chemical Formula 4-1]

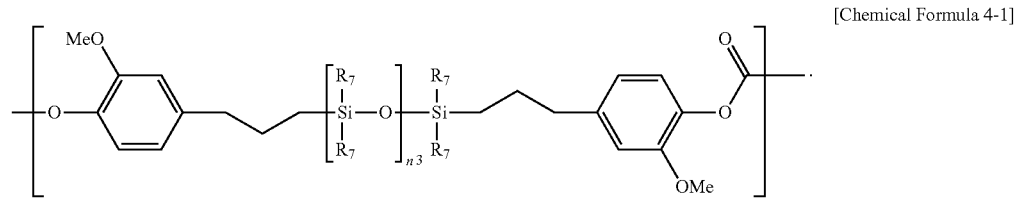

15. The copolycarbonate resin composition of claim 1, wherein the copolycarbonate resin including the aromatic polycarbonate-based first repeating unit and the aromatic polycarbonate-based second repeating unit having at least one siloxane bond includes 0.001 wt % to 10 wt % of the second repeating unit.

16. The copolycarbonate resin composition of claim 1, wherein the copolycarbonate resin including the aromatic polycarbonate-based first repeating unit and the aromatic polycarbonate-based second repeating unit having at least one siloxane bond has a weight average molecular weight of 1,000 g/mol to 100,000 g/mol.

17. An article comprising the copolycarbonate resin composition of claim 1.

* * * * *